Oct. 13, 1925. 1,556,850
G. KÜHNE
MACHINE FOR SOWING SEED
Filed March 29, 1924 2 Sheets-Sheet 2

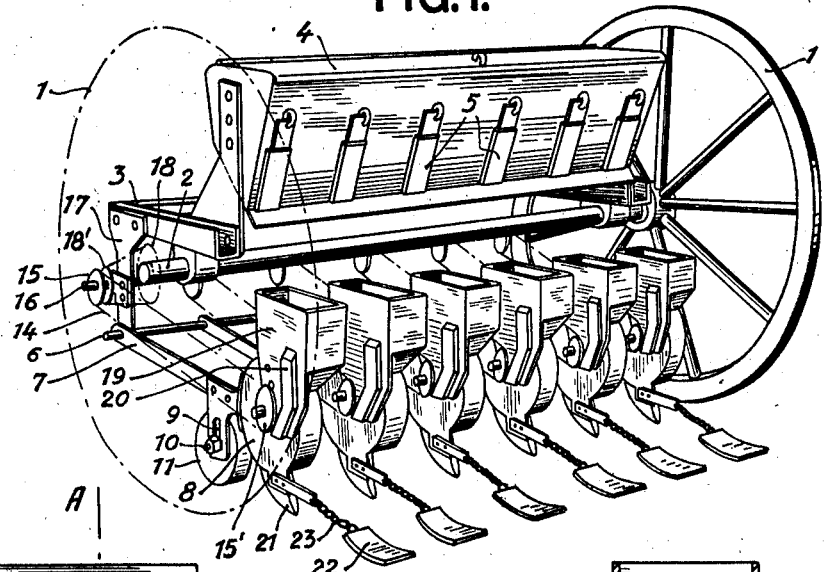

Inventor:
Georg Kühne

Patented Oct. 13, 1925.

1,556,850

UNITED STATES PATENT OFFICE.

GEORG KÜHNE, OF KONIGSBERG, GERMANY.

MACHINE FOR SOWING SEED.

Application filed March 29, 1924. Serial No. 702,988.

*To all whom it may concern:*

Be it known that I, GEORG KÜHNE, a German citizen, residing at Konigsberg, Pr., Germany, have invented new and useful Improvements in a Machine for Sowing Seed, of which the following is a specification.

The invention relates to a machine for sowing corn or the like grain by grain, which as a mobile machine can be drawn over the prepared field to deposit the seeds singly in each individual row with a predetermined equal spacing, whereby the plants growing from the isolated seeds are afforded most generous growing conditions, namely an ample spacing and correct depth in the earth for germination.

In the new machine one or more chain driven sowing wheels provided with a number of buckets having spoon-like devices conforming to the shape of the seed are driven through a supply of seed. Surplus seeds fall back by gravity to the supply receptacle and ultimately only a single seed is retained by each spoon and ejected through an aperture in the wheel casing. The seeds are isolated and deposited by one mechanism and an auxiliary device need not be employed to cause the rejected seeds to pass back to the sowing wheel.

In order that the seeds may be planted at the correct depth in the ground, an adjustable furrowing device is provided.

The sowing wheel can be raised or lowered into inoperative or operative position by lever and quadrant means in known manner.

The appended drawings show an example of corn separating and sowing machine according to the invention.

Figure 4:
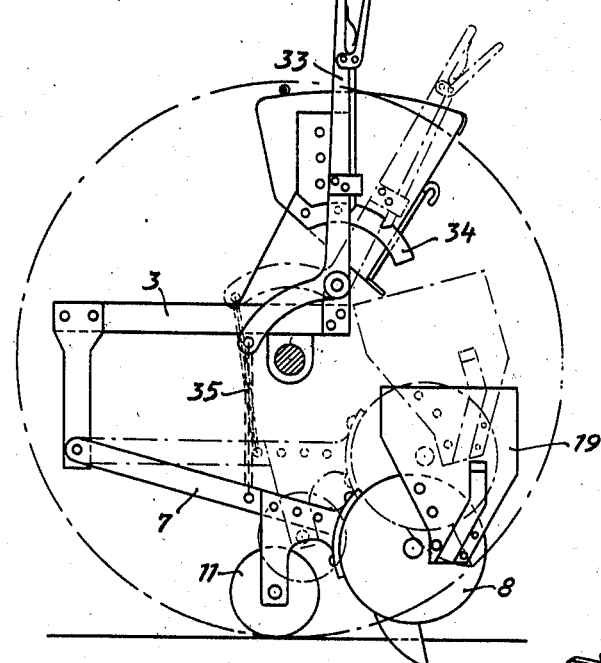
Figure 7:
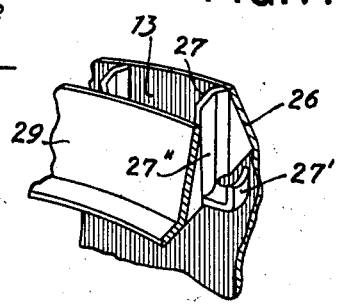
Figure 5:
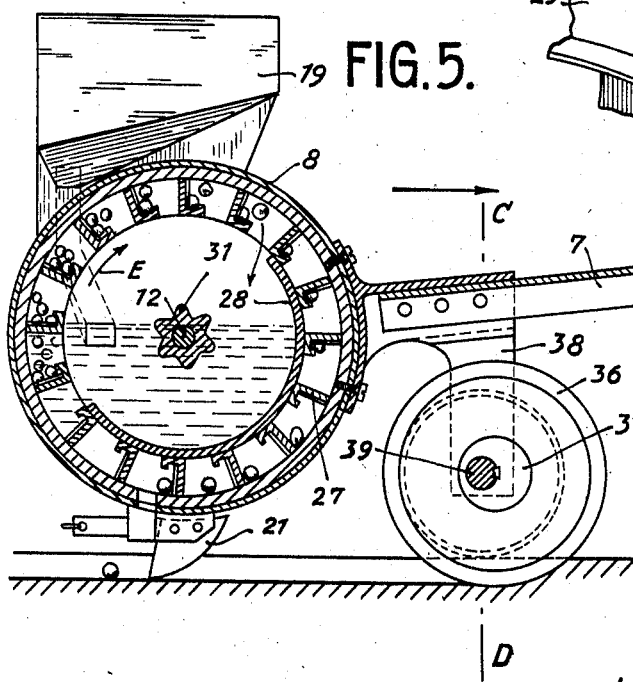
Figure 6:
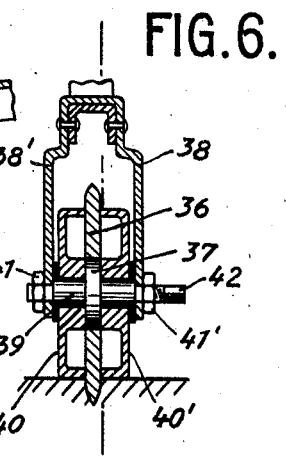

Figure 1 is a perspective view of a machine capable of sowing six rows simultaneously; Fig. 2 is a part sectional view of sowing wheel with feeding hopper and carrier; Fig. 3 is a section on line A—B of Fig. 2; Fig. 4 is an elevation showing the controlling mechanism; Fig. 5 is a view of a modified form of wheel from that shown in Fig. 2; Fig. 6 is a section on line C—D of Fig. 5; Fig. 7 is an enlarged fragmentary view of a cell of the sowing wheel.

The carriage of the machine comprises two transport wheels 1 fast on an axle 2 upon which the frame 3 is pivoted. This carries a box 4 for the supply of seed, having an inclined rear wall, provided with a number of slides 5 which when open allow seed to escape. In the frame 3 is horizontally arranged a rod 6 upon which pivot arms 7 carrying the cylindrical wheel casings 8. The arms 7 are supported by rollers 11 having pivots 10 adjustable in slots 9 whereby the depth of furrow may be regulated.

In each wheel casing 8 is rotatably mounted a shaft 12 upon which is fixed the sowing wheel 13. The drawings show one wheel in each casing, but more than one could be arranged in a suitable casing if desired. The shaft 12 is driven by chains 14, whereof the chain wheels 15, $15^1$ are respectively mounted upon the sowing wheel shaft 12 and a driving shaft 16 journalled upon the frame 3 and driven from axle 2 by chain drive 17 and chain wheels 18, $18^1$.

Attached to each wheel casing 8 is a feeding hopper 19 for the seed which leaves by a duct 20 to between the wheel 13 and casing 8. To the under side of the housing is fixed a furrowing tool 21 and also a shoe 22 upon a chain 23 serving to cover over the seed trench.

The sowing wheel casing 8 is strengthened at its periphery by a ring 24 which enables the thin iron casing to retain its form without the use of clips, and near the lowest point is an aperture 25 for the discharge of the seed. The wheel 13 running within the casing is built as a bucket wheel, the cells or buckets being formed by a disk 26 fast upon shaft 12, partitions 27 and a ring 29, and also has a partition 28 adapted to shut off a portion of the inner circumference. Disk 26 and ring 29 converge towards their outer edges to facilitate the depositing of the seeds. The partitions 27 are, as shown in Fig. 7, each provided with a spoon-like portion $27^1$ conforming to the shape of a single seed, which in this case is of longish shape, but for round seeds would be practically hemispherical. To assist in the introduction of a seed of this elongated shape the cell walls 27 are each provided with a recessed portion $27^{11}$. The partition 28 is adjustable concentrically of the axle 12 by means of pin $28^1$, fly-nut $28^{11}$ and slot 30 in the casing 26. Fig. 2 shows the partition in working position, the dot-dash lines showing the position for emptying the contents of the casing. A corrugated wheel 31 keyed upon shaft 12 within the casing serves to prevent sticking of the seeds. A spring striker 32 fastened to the casing co-operates with the spoons 27¹ to assist in removing surplus seeds.

The arm 7 can be moved into operative or inoperative position (indicated by full and dot-dash lines respectively in Fig. 4) by means of lever 33 moving over quadrant 34 and connected to said arm by a chain 35. The supporting roller 11 (Fig. 2) may also be utilized as a furrower as shown in Figs. 5 and 6. In this case a sharp-edged disk 36 is rotatable upon an eccentric 37 of the axle 39 carried by the cheeks 38, 38¹ of the arm 7, the two rollers 40, 40¹ riding over the edges of the seed furrow produced by the disk 36. By slackening the securing bolts 41, 41¹, the position of the eccentric may be adjusted to give the desired depth of furrow by means of a key applied to the squared end 42 of the axle.

Fig. 5 shows the partition 28 somewhat modified from that shown in Fig. 2 and consists of a semi-cylindrical ring mounted upon the sowing wheel casing The operation of the machine is as follows:

The arms 7 are placed in inoperative position by moving lever 33 over quadrant 34. The casings 8 are charged with seed from the supply box 4 by means of the slides 5, the partition 28 being in position as shown in Fig. 2. The position of the roller 11 or of the eccentric 37 is adjusted so that the furrowing tool 21 presses more or less deep in the earth as desired. Upon moving the machine forward by animal or mechanical traction, the lever 33 being in the position shown in Fig. 4, the sowing wheels are rotated in the direction indicated by arrow E by means of the chain drives 14, 17. In each casing the bucket partitions 27 abstract seed from the supply and the seed not retained by the spoons 27¹ falls back into the casing till, as shown in Fig. 2, the topmost cell carries only two seeds of which the upper is dislodged by the striker 32. The single seed thus retained by the spoon is then caused by gravity to fall against the circumferential wall of the casing and thus through the aperture 25 into the furrow prepared by the tool 21 and disk 36, being finally covered over by the shoe 22. According to the gear of the chain drives the spacing of the seeds in the rows may be different.

The emptying of the casings, after bringing them into inoperative or raised position, is effected by placing the partition 28 in the dot-dash position shown in Fig. 2.

Should it be desired to sow the seeds in diamond formation i. e. alternately in adjacent rows, it is only necessary to displace adjacent sowing wheels relatively by half a cell space.

The above described sowing apparatus, being fitted with a supply box for the seed and a separate and complete sowing device for each row, can be used to sow rows of various arrangements and distances apart.

It is to be understood that I may employ any suitable type of furrow opening and covering mechanism in conjunction with the improved seed selecting and depositing means herein shown and described, though I prefer to employ the means herein illustrated.

I claim:

1. Machine for sowing seed comprising in combination a hopper, a bucket wheel rotatably mounted within a casing, a seed receptacle in communication with said hopper, an adjustable partition for separating a plurality of the buckets from the seeds in said seed receptacle and for emptying the seed receptacle.

2. Machine for sowing seed comprising in combination a hopper, a bucket wheel rotatably mounted within a casing consisting of a disc, an annulus and a plurality of radial partitions therebetween adjacent the periphery, the inner end of each partition being provided with a spoonlike device retaining a single seed and a recessed portion for guiding a single seed on said spoonlike device.

3. Machine for sowing seed comprising in combination a hopper, a bucket wheel rotatably mounted within a casing, a seed receptacle in communication with said hopper, means for gathering a plurality of seeds from said seed receptacle and retaining single seeds, and a spring actuated striker for removing surplus seeds.

4. In a machine of the character described the combination with a circular casing, of a bucket wheel rotatable therein and comprising a plurality of radial partitions the outer ends of which rotate in contact with said casing and the inner ends of which are spaced from each other to leave open passages through which seeds may pass from the inner periphery of the bucket wheel to the outer periphery thereof, the inner end of each partition being provided with a spoonlike seed retaining portion, an aperture in the lower part of said casing through which seeds are discharged, a partition within said casing forming the lower wall of the seed receptacle and means for adjusting the angle of inclination of said partition.

5. In a machine of the character described the combination with a circular casing, of a bucket wheel rotatable therein and comprising a plurality of radial partitions the inner ends of which are provided with spoonlike seed retaining portions, a seed compartment located within the interior of the bucket wheel, means for feeding seeds into said compartment and means for adjusting the position of the bottom of said compartment.

6. A structure as recited in claim 5 wherein said adjusting means is controllable from the exterior of said compartment.

7. A structure as recited in claim 5 in combination with an agitator rotatable within the compartment and movable with the bucket wheel.

8. A structure as recited in claim 5 in combination with a movable bottom for the compartment, means adjusting said bottom from the exterior of the compartment, and an agitator rotatable within the compartment.

9. In a device of the character described the combination with a circular casing, of a bucket wheel mounted for rotation therein and comprising a pair of spaced annuli, a plurality of radial partitions, constituting buckets disposed between said annuli and passages between said partitions extending from the inner to the outer periphery of the bucket wheel, the space within the bucket wheel constituting a seed chamber, a seed hopper, means for conducting seed from the hopper to the seed compartment and a movable bottom for the seed compartment having a portion shaped to conform to the curvature of the inner periphery of the bucket wheel.

10. A structure as recited in claim 9, in combination with means for adjusting the position of the movable bottom from the exterior of the casing.

11. A structure as recited in claim 9, in combination with a centrally disposed drive shaft and a toothed agitator thereon.

12. A device of the character described comprising a circular casing, a bucket wheel in the form of an annulus, mounted for rotation therein and comprising a plurality of spaced buckets each having a seed carrying compartment and a yieldable element located inside of the bucket wheel and supported from the casing, the free end of which engages the inner ends of said buckets to snap past them as they rotate and thereby impart a series of blows to the bucket wheel to dislodge surplus seeds from the buckets.

GEORGE KÜHNE.